United States Patent [19]

Nadolski et al.

[11] Patent Number: 4,845,627
[45] Date of Patent: Jul. 4, 1989

[54] REMOTE PROGRAMMABLE CONTROLLER

[75] Inventors: Gregory L. Nadolski, Brookfield; Russell P. Schuchmann, Milwaukee, both of Wis.

[73] Assignee: Eaton Corporation, Cleveland, Ohio

[21] Appl. No.: 103,616

[22] Filed: Oct. 1, 1987

[51] Int. Cl.$^4$ ............................................. G06F 9/00
[52] U.S. Cl. ................................... 364/468; 364/147; 364/513; 901/9; 901/19; 901/46
[58] Field of Search ....................... 364/147, 468, 513; 901/2, 9, 19, 46

[56] References Cited

U.S. PATENT DOCUMENTS

| | | | |
|---|---|---|---|
| 4,038,562 | 7/1977 | Kintner | 307/203 |
| 4,200,914 | 4/1980 | Kintner | 364/900 |
| 4,227,247 | 10/1980 | Kintner | 364/900 |
| 4,488,241 | 12/1984 | Hutchin et al. | 364/513 |
| 4,521,844 | 6/1985 | Sturges, Jr. et al. | 364/513 |
| 4,547,858 | 10/1985 | Horak | 364/513 |
| 4,569,045 | 2/1986 | Schieble et al. | 370/85 |
| 4,578,764 | 3/1986 | Hutchin et al. | 364/513 |
| 4,633,414 | 12/1986 | Yabe et al. | 364/513 |
| 4,641,251 | 2/1987 | Inoue | 364/513 |

OTHER PUBLICATIONS

Altera Data Book-EP1210DC, pp. 2-44 Through 2-55 (Product Catalog).

Primary Examiner—A. D. Pellinen
Assistant Examiner—Jeffrey A. Gaffin
Attorney, Agent, or Firm—J. G. Lewis

[57] ABSTRACT

Automated manufacturing equipment (10) such as robot arms for performing a manufacturing operation on a work piece (12) have a relatively stationary host machine (14) with central programmable logic means (16) which receive various parametric inputs (26) and thereby control movement and operation of a machine element (18) suspended at the end of an articulated arm (20) for positioning with respect to the work piece in response to the control signals. A small programmable logic controller (30) disposed for movement with the machine element receives inputs and performs local AND/OR logic on a number of input signals from transducers (28) measuring various parameters associated with movable machine elements. The local I/O device then performs selective AND/OR ladder logic functions on the transducer output signals and outputs a single resultant signal as a function thereof in real-time to the central logic means.

7 Claims, 5 Drawing Sheets

LOGIC PROGRAMMING TABLE

| AND/OR SWITCH SETTING | | | | | RESULTANT LOGIC EQUATION |
|---|---|---|---|---|---|
| A | B | C | D | E | |
| 0 | 0 | 0 | 0 | 0 | S1·S2·S3·S4·S5·S6 |
| 0 | 0 | 0 | 0 | 1 | S1·S2·S3·S4·(S5+S6) |
| 0 | 0 | 0 | 1 | 0 | S1·S2·S3·S6·(S4+S5) |
| 0 | 0 | 0 | 1 | 1 | S1·S2·S3·(S4+S5+S6) |
| 0 | 0 | 1 | 0 | 0 | S1·S2·S5·S6·(S3+S4) |
| 0 | 0 | 1 | 0 | 1 | S1·S2·(S3+S4)·(S5+S6) |
| 0 | 0 | 1 | 1 | 0 | S1·S2·S6·(S3+S4+S5) |
| 0 | 0 | 1 | 1 | 1 | S1·S2·(S3+S4+S5+S6) |
| 0 | 1 | 0 | 0 | 0 | S1·S4·S5·S6·(S2+S3) |
| 0 | 1 | 0 | 0 | 1 | S1·S4·(S2+S3)·(S5+S6) |
| 0 | 1 | 0 | 1 | 0 | S1·S6·(S2+S3)·(S4+S5) |
| 0 | 1 | 0 | 1 | 1 | S1·(S2+S3)·(S4+S5+S6) |
| 0 | 1 | 1 | 0 | 0 | S1·S5·S6·(S2+S3+S4) |
| 0 | 1 | 1 | 0 | 1 | S1·(S2+S3+S4)·(S5+S6) |
| 0 | 1 | 1 | 1 | 0 | S1·S6·(S2+S3+S4+S5) |
| 0 | 1 | 1 | 1 | 1 | S1·(S2+S3+S4+S5+S6) |
| 1 | 0 | 0 | 0 | 0 | (S1+S2)·S3·S4·S5·S6 |
| 1 | 0 | 0 | 0 | 1 | (S1+S2)·S3·S4·(S5+S6) |
| 1 | 0 | 0 | 1 | 0 | (S1+S2)·S3·(S4+S5)·S6 |
| 1 | 0 | 0 | 1 | 1 | (S1+S2)·S3·(S4+S5+S6) |
| 1 | 0 | 1 | 0 | 0 | (S1+S2)·(S3+S4)·S5·S6 |
| 1 | 0 | 1 | 0 | 1 | (S1+S2)·(S3+S4)·(S5+S6) |
| 1 | 0 | 1 | 1 | 0 | (S1+S2)·(S3+S4+S5)·S6 |
| 1 | 0 | 1 | 1 | 1 | (S1+S2)·(S3+S4+S5+S6) |
| 1 | 1 | 0 | 0 | 0 | (S1+S2+S3)·S4·S5·S6 |
| 1 | 1 | 0 | 0 | 1 | (S1+S2+S3)·S4·(S5+S6) |
| 1 | 1 | 0 | 1 | 0 | (S1+S2+S3)·(S4+S5)·S6 |
| 1 | 1 | 0 | 1 | 1 | (S1+S2+S3)·(S4+S5+S6) |
| 1 | 1 | 1 | 0 | 0 | (S1+S2+S3+S4)·S5·S6 |
| 1 | 1 | 1 | 0 | 1 | (S1+S2+S3+S4)·(S5+S6) |
| 1 | 1 | 1 | 1 | 0 | (S1+S2+S3+S4+S5)·S6 |
| 1 | 1 | 1 | 1 | 1 | (S1+S2+S3+S4+S5+S6) |

FIG 4

REMOTE PROGRAMMABLE CONTROLLER

FIELD OF THE INVENTION

The present invention relates to logic devices that can be programmed to perform single-rung ladder logic on inputs from a plurality of sensors associated with a machine performing a manufacturing process. More particularly, the present invention relates to such programmable devices operating in real-time high speed applications.

BACKGROUND OF THE INVENTION

The task of a programmable controller is to compute the logic status represented by interconnected sensor contacts and to apply the end result of such logic computation to energize or de-energize a transducer or actuator employed in a manufacturing process or, alternatively, to send such result to the outside to control external devices relating such process.

This logic and the interconnected contacts represented thereby are typically illustrated by a diagram. The convention used in such diagram is based on the standard practice used to represent electro-mechanical relay logic and is retained in programmable controller applications because of the widespread familiarity with this type of diagram, commonly termed "a ladder diagram" because each set of logic that corresponds to one output resembles the rung of the ladder. That is, in a ladder diagram, the left and right verticals are the power lines and the horizontal "rungs" are the sets of logic representing the control elements such as interconnected contacts of transducers associated with a particular machine element.

Automated manufacturing equipment frequently employ numerous machine elements such as robot arms, each having several sensors to locate or position the work piece and/or the robot arm with respect to an assembly line or work station. The output signals from these sensors are typically routed across a movable/fixed interface of the robot to a control device. The large wire bundle resulting from the multiplicity of signals is subject to flexure and breakage at the interface between the fixed base and the movable parts of the robot. It is difficult to construct a large cable consisting of many wires which is resistent to breakage resulting from flucture. Although a small number of wires can be formed into a flexible bundle, as for example a coil telephone cord, typical automated manufacturing equipment would require numerous bundles interconnecting the fixed base and the movable parts of the robot which has proven to be unwieldy and expensive in practice.

Alternative methods of wire reduction known in the prior art are based upon the multiplexing of signals from multiple sensors over a single pair of wires on a time share basis. However, such multiplexing inherently introduces transport lag and/or signal timing skew which can adversely affect machine performance and control system complexity. The need to avoid transport lag is particularly acute in high speed operations such as product packaging and bottling operations where faulty product must be rejected in real-time. Furthermore, known prior art approaches are typically extremely expensive, complex and have large package envelopes which are difficult to mount on high speed robot heads.

It will be apparent from a reading of the specification that the present invention may be advantageously utilized in many different machine applications. However, the invention is especially useful when applied to automated robotic equipment used in various high speed manufacturing processes, and will be described in connection therewith.

BRIEF DESCRIPTION OF THE INVENTION

The present invention represents an extremely low cost alternative to multiplexing transducer signals in apparatus performing a manufacturing operation on a work piece where the transducer outputs are employed in ladder logic for control of a movable machine element and overcomes many of the above-described shortcomings of the prior art by providing local logic means associated with the machine element which includes one or more transducers functionally related to the element, each transducer operative to sense a parametric condition thereof and generate an output signal as a function of that condition and a locally programmable I/O device disposed for movement with the machine element. The I/O device is operative to receive the transducer output signals, perform selective and/or ladder logic functions thereon and output a single resultant signal as a function thereof in real-time to a central logic means associated with a relatively stationary host machine which receives such parametric inputs and generates control signals as a function thereof to operate means drivingly engaging the machine element for positioning or operation with respect to a work piece. This arrangement has the advantage of providing an inexpensive and simply constructed system employing local logic with a movable machine element performing local processing in real-time.

According to one aspect of the invention, resilient circuit means containing a single conductor pair interconnects the locally programmable I/O device with the central logic means. This arrangement provides real-time control of the machine element over a single conductor pair to minimize inertia (and increase response) of the movable machine element and enhance the integrity of the electrical interface.

According to another aspect of the invention, the local logic means includes a sensor activation switch associated with each transducer which selectively fixes an output logic state independent of the associated transducers sensed parametric condition. This arrangement has the advantage of allowing selective disablement of transducers associated with the movable machine element.

According to another aspect of the invention, the local logic means includes an AND/OR logic set switch associated with all but the first transducer in the logic rung. The AND/OR logic set switches permit operator ease in selection of an output logic state change characteristic for each associated transducer.

According to still another aspect of the invention, the local logic means includes a known number of transducers, a sensor actuation switch for each transducer and an AND/OR logic set switch for all but the first transducer whereby an output logic state of each is ANDed or ORed with a previous transducer.

These are other aspects and advantages of the present invention will become apparent upon reading the following specification, which, along with the application drawings describes and discloses a preferred embodiment of the invention, as well as modifications thereof, in detail.

A detailed description of the embodiment of the invention makes reference to the accompanying drawings.

BRIEF DESCRIPTION OF THE DRAWINGS

FIG. 2b, is an alternative embodiment of the locally programmable I/O device of FIG. 2a;

FIG. 4, is a logic programming table illustrating the various input-output logic combinations possible for the locally programmable I/O device of FIG. 2a.

DETAILED DESCRIPTION OF THE PREFERRED EMBODIMENTS OF THE INVENTION

Figure 1:
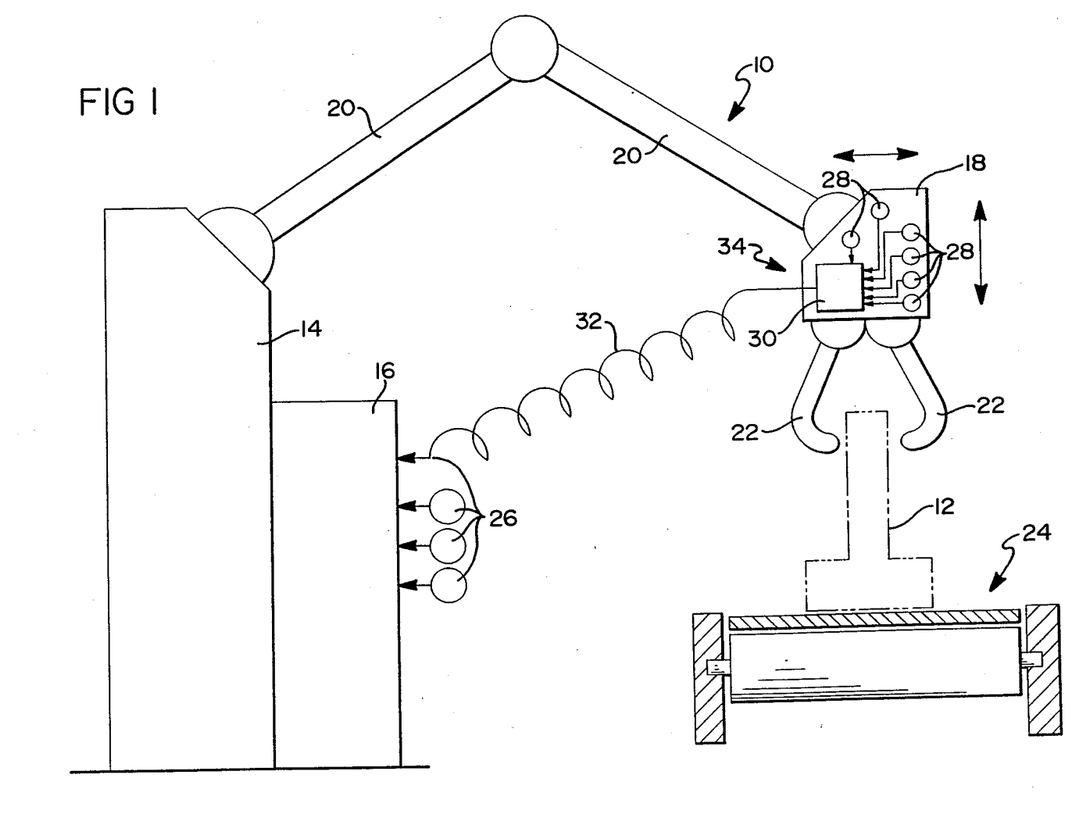
FIG. 1, is a plan view of an apparatus for performing a manufacturing operation on a work piece incorporating the preferred embodiment of the present invention.

Referring to FIG. 1, the present invention is preferably embodied in an apparatus (10) for performing a manufacturing operation on a work piece (12). Apparatus (10) is illustrated as a programmable robot including a relatively stationary host machine or base portion (14) with a central logic controller (16) associated therewith. A movable machine element (18) depends from base portion (14) through an articulated arm assembly (20) which drivingly engages machine element (18) for multi-axis positioning with respect to work piece (12) in response to control signals generated by controller (16). Control signals from controller (16) energize actuation devices within base portion (14) to both position machine element (18) and to control actuation devices such as mandibles (22) carried thereon which, in the illustrated embodiment of FIG. 1, serve to grip, lift and reposition work piece (12) as it is carried along a conveyer system (24) as part of a total manufacturing facility. The structural details of base portion (14), central logic controller (16), machine element (18) and arm assembly (20) are deleted here for the sake of brevity, it being understood that the illustrated apparatus (10) is in and of itself known in the art and is being presented only as an example of one of many types of mechanisms to which the present invention can be applied.

Controller (16) has a number of parametric inputs (26) which are processed therein to generate the control signals. Inputs (26) can be from local operator input of data, inputs from remote locations such as machines at other work stations or other inputs from transducers otherwise monitoring the manufacturing process. Machine element (18) has a number of sensors or transducers (28) associated therewith which monitor or control various aspects of its operation. In the present embodiment such functions could be, by way of example, machine element acceleration and position, mandible position and applied force, work piece location and other suitable inputs. The common feature of all of such inputs is that they relate to the operation being performed at the illustrated work station and as such are electrically interconnected on the same logic rung of the device ladder diagram.

The electrical outputs of transducers (28) are electrically connected to a small locally programmable logic device (30) which, as will be described in detail later in below, can be programmed to perform a single-rung ladder logic on the inputs from sensors (28). Logic device (30) locally processes inputs from sensors located on or associated with machine element (18) so that only a resultant discrete signal need be passed to central logic controller (16) through a suitable flex wire interface (32) comprising a shielded single twisted pair of conductors terminating at controller (16) to provide one of the inputs (26) thereto. Transducers (28) and local logic device (30) collectively comprise local logic means (34) which typically would be carried by machine element (18). However, in the broadest sense of the present invention, some or all portions of local logic means (34) can be disposed remotely from machine element (18).

Figure 2A:
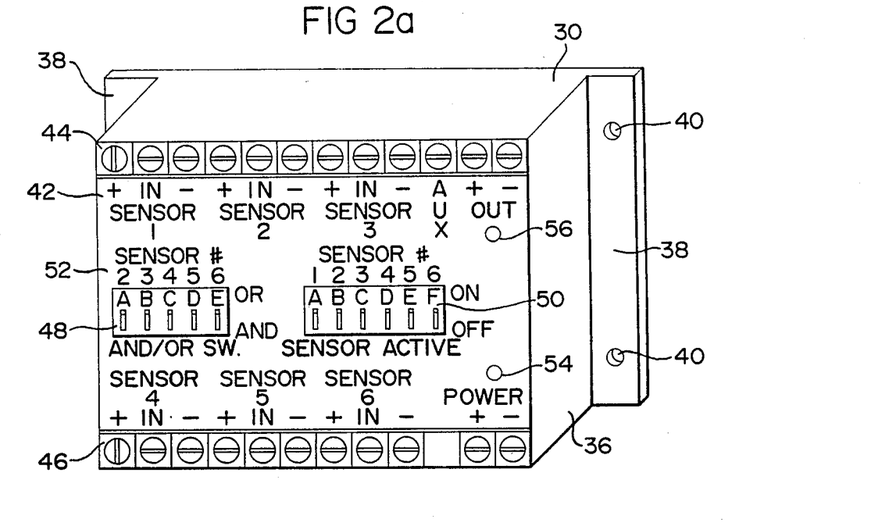
FIG. 2a, is a locally programmable I/O device of FIG. 1 showed on an expanded scale.

Referring to FIG. 2a the external structural details of local logic device (30) are illustrated. Device (30) constitutes a substantially closed housing (36) appropriately sealed from the relatively dirty environment typically associated with manufacturing processes. Housing (36) has two flange portions (38) formed therein with appropriate through bores (40). Appropriate fasteners (not shown) pass through bores (40) for mounting device (30) to machine element (18). Housing (36) also comprises a front face (42) partitioned into terminal strips (44,46), an array of AND/OR logic set switches (48), an array of sensor activation switches (50) and a face cover (52) containing appropriate indicia indicating switch array and terminal function to the operator. LEDs (54,56) are mounted to face cover (52) to provide an indication of the application of electrical power to and output of a resultant signal from logic device (30), respectively.

Logic means (34) is illustrated as accommodating up to a total of six transducers (28). However, it is contemplated more or fewer inputs can be provided as required. Furthermore, it is contemplated that multiple local logic devices (30) can be serially arranged or branched with the output of one interconnected with one of the sensor inputs of another.

Terminal strips (44,46) contain three terminal sets for the plus (HI), minus (LO) and signal input (IN) for each of the six associated sensors (28). Furthermore, terminal strip (44) provides an auxiliary (AUX) input terminal as well as plus (OUT-HI) and minus (OUT-LO) terminals and terminal strip (46) provides a plus (PWR-HI) and minus (PWR-LO) power input terminals. Logic device (30) will thus accept six "N" sensor outputs which provide an "ON" output of between 0 and 1 vdc. Controller inputs provide a load of about 5K ohms to the sensor outputs. The auxiliary input, described above, has the same characteristics as the sensor inputs. Because sensors (28) are supplied from a local power supply (not shown), have a common signal ground, and are located close to logic device (30), the inputs are illustrated as being the non-isolated type. However, photo-isolated inputs could be provided if desired.

The output terminals on terminal strip (44) represent a single "N" type output capable of sinking 50 ma.

The embodiment of the present invention described herein requires the provision of DC power between 10 and 30 vdc to local logic means (34) to serve both as the sensor (28) power supply and logic means (34) power supply. Any power supply provided should be regulated internally to 5 vdc for powering logic device (30), but should be fed directly to sensors (28) without regulation. Logic device (30) can also use the unregulated input power as its power source. As can be seen in the schematic diagram of FIG. 3, the power input terminals are bridged by a series diode (58) to guard against reverse polarity in series with a varistor (60) for transient protection.

Local programming of logic means (34) is accomplished by setting switches A-E of AND/OR logic switch array (48). Switches A-E are provided for each of the five sensor inputs following the first. Depending upon the position of each switch, the logic is set so that the associated sensor (28) output is either ANDed or ORed with the previous sensor. Using this technique, any of the ladder diagrams or a resultant equations illustrated in FIG. 4 can be programmed. In FIG. 4, the resultant logic equation terms $S_1$-$S_6$ designate individual sensor (28) outputs. Switches A-F of sensor activation switch array (50) permits bypassing sensor locations that may not be connected or which are to be held inactive in the ladder. This switch has the effect of causing sensor output associated with that switch to pass a true or on state to the internal logic, regardless of whether a sensor is connected at that position and what its output may be. Normally, the associated AND/OR switch A-E of array (48) for an inactive sensor location would be programmed to the AND state. As will hereinafter be described in greater detail, auxiliary input terminal on terminal strip (44) is available which is ORed with the output of the ladder logic described above. This permits a simple two rung ladder where the second rung is a single contact connected in parallel with the first rung. This might be useful for emergency stop or override control functions.

Figure 2B:
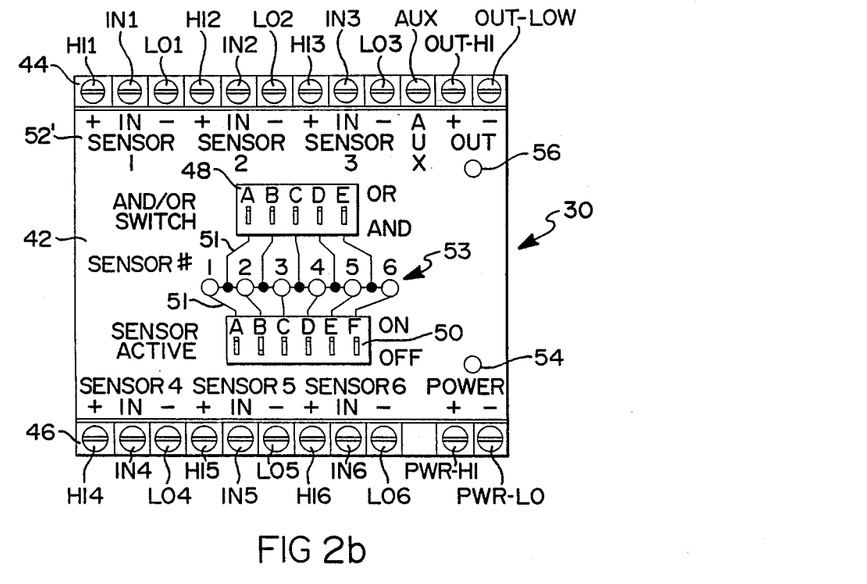

FIG. 2b is an alternative embodiment of the invention showing the same local logic device (30) of FIG. 2a including front face (42) terminal strips (44, 46) switch arrays (48,50) and LEDs (54,56). The major difference between the embodiments of FIG. 2a and FIG. 2b are that switch arrays (48,50) on face cover (52') are relocated and lead lines (51) drawn from switches A-E and A-F of switch arrays (48,50), respectively, to a graphical representation (53) of the electrical interconnection of the transducers (28) with respect to logic device (30). Because devices of the type described herein can be programmed by relatively unskilled operators, self-evident indicia of the type described has been found to be instructive to the operator.

Figure 3:
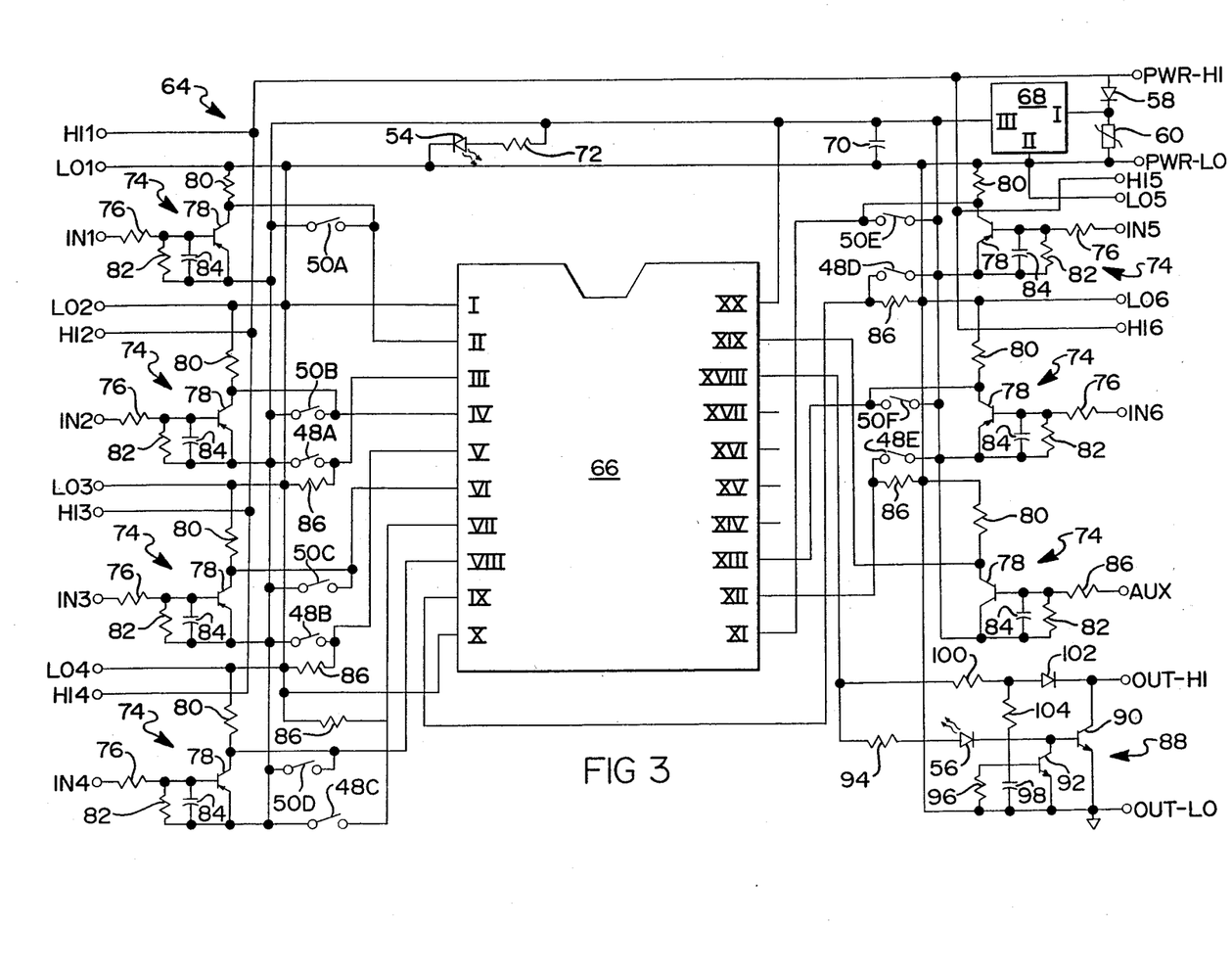
FIG. 3, is a schematic diagram of the locally programmable I/O device of FIGS. 2a and 2b.

Referring to FIG. 3, the logic device (30) electronics, indicated generally at (64) is illustrated. The heart of the electronics (64) is a programmable logic device or PLD (66) such as a CMOS erasable programmable logic device (EPROM) model EP320 manufactured by Altera. Similar equivalent devices are known to be manufactured by Intel and others. Power is supplied to electronics (64) via PWR-HI terminal which is internally connected to all six plus (HI) terminals associated with transducers (28). PWR-HI terminal is also interconnected to the input terminal I of a type 7805 Fairchild voltage regulator (68) through diode (58). Likewise, the minus (PWR-LO) input terminal is directly connected to the minus (LO) terminals of each sensor (28) terminal set and to ground terminal X of PLD (66). PWR-LO terminal is also connected to common terminal II of voltage regulator (68) and to input terminal I thereof through varistor (60). Output terminal III of voltage regulator (68) is interconnected to common terminal II thereof through a 10 microfared filter capacitor (70) and a series combination of a 1.5K ohm current limiting resistor (72) and LED (54) described herein above.

The output of voltage regulator (68) is directly related to the VCC input XX of PLD (66) and interconnected with input terminals II, IV, VI, VIII, XI, XIII through sensor activation switches (50a, 50b, 50c, 50d, 50e, and 50f, respectively. Likewise, output terminal III of voltage regulator (68) is interconnected with input terminals III, V, VII, VIIII, XII of PLD (66) through AND/OR logic switches 48a, 48b, 48c, 48d, 48e, respectively. The common terminal II of voltage regulator (68) is also directly connected to enable (clock) input terminal I of PLD (66) and to the power OUT-LO terminal.

The transducer input terminals $IN_{1-6}$ are connected to separate signal conditioning circuits (74), each comprising a 4.7K ohm series resistor (76) interconnected to the base of a type 2N3906 transistor (78). The collector of each transistor (78) is interconnected to its respective LO terminal through a 4.7K ohm current limiting resistor (80). The base to emitter junctions of transistors (78) are interconnected by a parallel combination of a 2.2K ohm resistor (82) and a 0.47 microfared capacitor (84). The collector of transistors (78) associated with input terminal sets 1-6 are directly connected to input terminals II, IV, VI, VIII, XI, XIII of PLD (66). Terminals III, V, VII, VIIII, XII of PLD (66) are interconnected to the common terminal of voltage regulator (68) through separate 4.7K ohm pull down resistors (86).

The auxiliary input terminal is also input into an identical signal conditioning circuit (74) including resistors (76, 80, 82) capacitor (84), and transistor (78). An emitter of transistor (78) associated with the auxiliary input signal conditioning circuit (74) is interconnected to the output terminal III of voltage regulator (68). The collector of transistor (78) of auxiliary signal conditioning circuit (74) is electrically connected to input terminal XIX of PLD (66) and interconnected to the common terminal of voltage regulator (68) through resistor (80) of auxiliary terminal signal conditioning circuit (74).

A logic device output circuit shown generally at (88) provides short circuit protection and output signal conditioning for logic device (30). The collector to emitter junction of a type 2N3904 transistor bridges OUT-HI and OUT-LO terminals. The base of transistor (90) is interconnected to OUT-LO terminal through the collector to emitter junction to a second type 2N3904 transistor (92) as well as interconnected to output terminal XVIII through a series combination of LED (56) and a 680 ohm current limiting resistor (94). The base of transistor (92) is interconnected with OUT-LO terminal through a parallel combination of a 4.7K ohm resistor (96) and a 0.022 microfared capacitor (98). Output terminal XVIII of PLD (66) is also interconnected to OUT-HI terminal through a series combination of 4.7K ohm resistor 100 and a forward biased type 1N4148 diode 102. The point of common connection of resistor 100 and diode 102 is interconnected with the base of transistor (92) through a 4.7K ohm resistor 104.

In each signal conditioning circuit (74), resistors (76,82) provide a voltage divider and capacitors (84) provides an appropriate time constant for filtering incoming noise spikes. In output circuit (88), capacitor (98) establishes a time delay for turn on of transistor (92), thereby allowing transistor (90) to conduct in the interim. Current flowing from output terminal XVIII of PLD (66) turns on transistor (90), pulling the collector voltage of transistor (90) down whereby transistor (92) will remain off. If the load across terminals OUT-HI and OUT-LO is short circuited, transistor (90) pulls out of saturation (at approximately 150 ma) back biasing diode (102). This permits current from terminal XVIII of PLD (66) to turn on transistor (92) clamping transistor (90) off.

PLD (66) is an erasable programmable logic device in which CMOS EPROM technology is utilized to configure connections in a programmable AND logic array. EPROM connections are also used as a means to control the device output-feedback options (such as registered or combinatorial, active high or active low). As described herein above, the preferred PLD (66) device provides ten dedicated inputs which can be configured for input, output or bi-directional operation. The internal architecture of PLD (66) is organized with a known sum of products (AND/OR) structure. The architecture, programming and operation of the Altera EP320 device is fully described in a product application note contained in a product catalog entitled "Altera Data Book-EP1210DC," pages 2-44 through 2-55 which is incorporated herein by reference.

Figure 5:
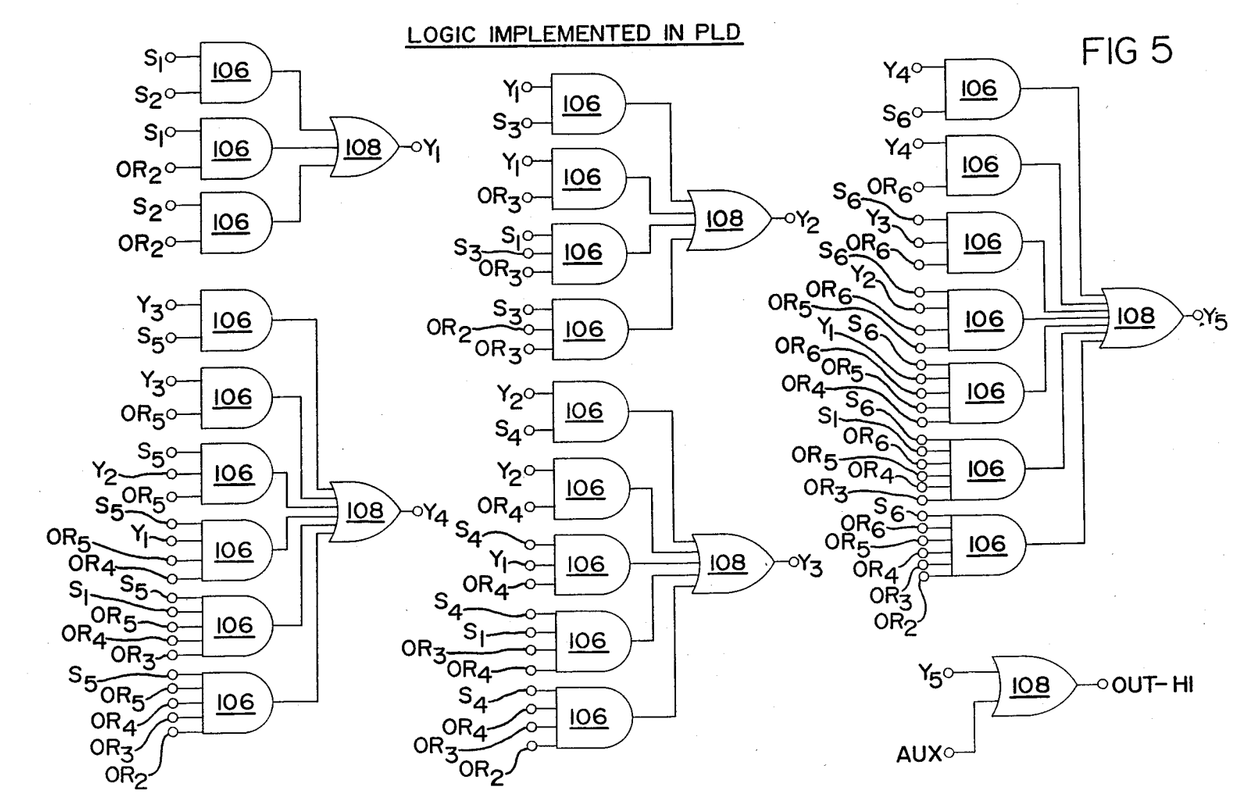
FIG. 5, is a diagram of logic implemented within a programmable memory device illustrated schematically in FIG. 3.

Referring to FIG. 5, the preferred logic implemented in PLD (66) is illustrated. Standard AND/OR gates (106,108), respectively having multiple inputs from several sources are illustrated. It is contemplated that the illustrated logic is by way of example and numerous variants would be obvious to one of ordinary skill in the art in view of this specification for other applications of the present invention. Inputs designated $S_1$ through $S_6$ relate to terminals II, IV, VI, VIII, XI, and XIII of PLD (66), respectively. Inputs designated $OR_2$ through $OR_6$ relate to inputs at terminals III, V, VII, VIIII, XII, respectively. The outputs designated $Y_1$ through $Y_5$ of the OR gates (108) are internal logic nodes within PLD (66) which are interconnected to one or more inputs of a succeeding logic device.

It is to be understood that the invention has been described with reference to specific illustrated embodiments which provide the features and advantages previously described, and, that such specific embodiments are susceptible of modification as will be apparent to those skilled in the art. For example, the component values and voltage/current levels recited are only for example, describing one embodiment of the invention known to yield satisfactory results. Accordingly, the invention is limited only by the scope of the following claims.

What is claimed is:

1. An apparatus for performing a manufacturing operation on a work piece, said apparatus comprising:
   a relatively stationary host machine including central logic means operative to receive parametric inputs and generate control signals as a function thereof;
   at least one movable machine element;
   means drivingly engaging said machine element for positioning with respect to said work piece in response to said control signals; and
   local logic means associated with said machine element including a plurality of transducers functionally related to said machine element, each transducer operative to sense a parametric condition thereof and generate an output signal as a function of said condition, and a locally programmable IO device disposed for movement with said machine element, said IO device operative to receive said transducer output signals, perform selective AND-/OR ladder logic functions thereupon and output a single resultant signal as a function thereof in real time to said central logic means, said resultant signal comprising one of said parametric inputs.

2. The apparatus of claim 1, further comprising resilient circuit means interconnecting said central logic means and local logic means, and operative to transmit said resultant signal therebetween over a single conductor pair.

3. The apparatus of claim 1, wherein at least one of said transducers are disposed for movement with said machine element.

4. An apparatus for performing a manufacturing operation on a work piece, said apparatus comprising:
   a relatively stationary host machine including central logic means operative to receive parametric inputs and generate control signals as a function thereof;
   at least one movable machine element;
   means drivingly engaging said machine element for positioning with respect to said work piece in response to said control signals; and
   local logic means associated with said machine element including a plurality of transducers functionally related to said machine element, each transducer operative to sense a parametric condition thereof and generate an output signal as a function of said condition, and a locally programmable IO device disposed for movement with said machine element, said IO device operative to receive said transducer output signals, perform selective AND-/OR ladder logic functions thereupon and output a single resultant signal as a function thereof in real time to said central logic means, said resultant signal comprising one of said parametric inputs, said local logic means comprising a sensor activation switch associated with each transducer operative to fix an output logic state independent of said associated transducer's sensed parametric condition.

5. An apparatus for performing a manufacturing operation on a work piece, said apparatus comprising:
   a relatively stationary host machine including central logic means operative to receive parametric inputs and generate control signals as a function thereof;
   at least one movable machine element;
   means drivingly engaging said machine element for positioning with respect to said work piece in response to said control signals; and
   local logic means associated with said machine element including a plurality of transducer functionally related to said machine element, each transducer operative to sense a parametric condition thereof and generate an output signal as a function of said condition, and a locally programmable IO device disposed for movement with said machine element, said IO device operative to receive said transducer output signals, perform selective AND-/OR ladder logic functions thereupon and output a single resultant signal as a function thereof in real time to said central logic means, said resultant signal comprising one of said parametric inputs, said local logic means comprising an AND/OR logic set switch associated with a least one transducer operative to select an output logic state change characteristic for an associated transducer.

6. An apparatus for performing a manufacturing operation on a work piece, said apparatus comprising:
   a relatively stationary host machine including central logic means operative to receive parametric inputs and generate control signals as a function thereof;

at least one movable machine element;

means drivingly engaging said machine element for positioning with respect to said work piece in response to said control signals; and     local logic means associated with said machine element including a plurality of transducers functionally related to said machine element, each transducer operative to sense a parametric condition thereof and generate an output signal as a function of said condition, and a locally programmable IO device disposed for movement with said machine element, said IO device operative to receive said transducer output signals, perform selective AND-/OR ladder logic functions thereupon and output a single resultant signal as a function thereof in real time to said central logic means, said resultant signal comprising one of said parametric inputs, said local logic means comprising N transducers, N being an integer in excess of one, N sensor activation switches, one being associated with each transducer and operative to fix an output logic state independent of said associated transducer's sensed parametric condition, and N−1 AND/OR logic set switches, each being associated with a transducer and operative to select an output logic state change characteristic for its associated transducer, whereby an output logic state of each is ANDed or ORed with a previous transducer.

7. The apparatus of claim 6, wherein N equals six.

* * * * *